(12) United States Patent
Ohman et al.

(10) Patent No.: US 9,777,033 B2
(45) Date of Patent: Oct. 3, 2017

(54) METHOD FOR LIGNIN SEPARATION FROM BLACK LIQUOR

(75) Inventors: Fredrik Ohman, Gavle (SE); Hans Theliander, Göteborg (SE); Per Tomani, Huddinge (SE); Peter Axegard, Solna (SE)

(73) Assignee: VALMET AB, Sundsvall (SE)

( * ) Notice: Subject to any disclaimer, the term of this patent is extended or adjusted under 35 U.S.C. 154(b) by 125 days.

(21) Appl. No.: 14/385,263

(22) PCT Filed: Mar. 16, 2012

(86) PCT No.: PCT/SE2012/050293
§ 371 (c)(1),
(2), (4) Date: Dec. 20, 2014

(87) PCT Pub. No.: WO2013/137790
PCT Pub. Date: Sep. 19, 2013

(65) Prior Publication Data
US 2015/0119559 A1    Apr. 30, 2015

(51) Int. Cl.
*C07G 1/00*     (2011.01)
*C08H 8/00*     (2010.01)
(Continued)

(52) U.S. Cl.
CPC ............. *C07G 1/00* (2013.01); *C08H 6/00* (2013.01); *C08H 8/00* (2013.01); *D21C 11/00* (2013.01);
(Continued)

(58) Field of Classification Search
CPC ... C07G 1/00; C08H 6/00; C08H 8/00; D21C 11/0007
See application file for complete search history.

(56) References Cited

U.S. PATENT DOCUMENTS 9,067,959 B2 *   6/2015   Littorin .............. D21C 11/0007
9,175,438 B2 *   11/2015   Wimby .................... C08H 8/00
(Continued)

FOREIGN PATENT DOCUMENTS

GB          476344      12/1937
SE     WO2006031175      3/2006
(Continued)

OTHER PUBLICATIONS

Mullin J. W., "Cyrstallization and Precipitation," Ullmann's Encyclopedia of Industrial Chemistry, published online 2003, vol. 10, 581-630.*

*Primary Examiner* — Nicholas Hill
(74) *Attorney, Agent, or Firm* — Fasth Law Offices; Rolf Fasth

(57) ABSTRACT

The method is for separation of lignin from original black liquor ($BL_{IN}$) that has a first precipitation phase (PR1/PR2) for precipitation of lignin by a first acidification using acidifier, $CO_2$, at alkaline conditions, then separating a lignin cake with subsequent suspension of the lignin cake in a strong acid in order to leach out metals from the lignin followed by dewatering and obtaining a clean lignin product LP. Lignin germ particles (LG) are added to the original black liquor in the first precipitation stage, preferably between two phases in said precipitation stage, in order to increase lignin particle growth on such lignin germ particles instead of spontaneous nucleation of lignin particles in said original black liquor. This results in improved filterability in subsequent dewatering and lignin cake formation and hence an increased lignin yield.

5 Claims, 4 Drawing Sheets

(51) Int. Cl.
   *D21C 11/00*   (2006.01)
   *D21C 11/04*   (2006.01)
   *C08H 7/00*    (2011.01)
   *C10L 5/44*    (2006.01)

(52) U.S. Cl.
   CPC .......... *D21C 11/0007* (2013.01); *D21C 11/04* (2013.01); *C08L 2205/18* (2013.01); *C10L 5/44* (2013.01); *C10L 5/445* (2013.01); *Y02E 50/10* (2013.01); *Y02E 50/30* (2013.01); *Y02P 40/44* (2015.11)

(56) References Cited

U.S. PATENT DOCUMENTS

| | | | |
|---|---|---|---|
| 9,266,917 B2 * | 2/2016 | Bjorklund | ................ C07G 1/00 |
| 2011/0297340 A1 | 12/2011 | Kouisni | |

FOREIGN PATENT DOCUMENTS

| | | |
|---|---|---|
| SE | WO2009104995 | 8/2009 |
| SE | WO2010143997 | 12/2010 |
| WO | WO2011037967 | 3/2011 |

* cited by examiner

METHOD FOR LIGNIN SEPARATION FROM BLACK LIQUOR

PRIOR APPLICATION

This application is a U.S. national phase application based on International Application No. PCT/SE2012/050293, filed 16 Mar. 2012.

TECHNICAL FIELD

This invention relates to a method for lignin separation from spent cooking liquor, called original black liquor, using a precipitation process.

BACKGROUND

The advantages with lignin separation from black liquor is already described in WO 2006/031175 and WO2006/038863. These patents disclose the novel process Ligno-Boost™ that is now sold by Metso, and wherein WO 2006/031175 disclose the basic two stage acidic wash process and WO2006/038863 disclose an improvement of the process where sulphate or sulphate ions are added to the process.

An important aspect of the process is that the required charge of chemicals for the acidification may be high. If this is the case the cost of fresh chemicals is a large part of the operational cost and the commercial viability of the process is lower. These problems could be reduced, if the process is optimized for minimum requirement for charges of fresh chemicals, making the lignin product commercially sound. Acidifiers in form of mill generated waste flows is thus preferable as it may solve a waste disposal problem and lessen environmental impact. As the precipitation of lignin requires acidification of alkaline black liquor flows, much of the total amount of acidifier is used to decrease the pH level down to the point of where lignin starts to precipitate. The first phase reaching this pH level typically reduce the pH level from about pH 13 in the original black liquor down to a pH level about 11.5, and normally do not involve any nucleation of lignin particles. The amount of acidifier needed is nevertheless relatively high for this first phase as the pH follows a logarithmic scale, and any following additional lowering of pH from 11.5 requires far less acidifier for the same order of lowered absolute pH value.

The Lignoboost process produce a lignin product which if used as fuel is classified as a "green" fuel as being based upon recovered fuel. The idea with classification of "green" fuels is based upon the concept not to increase the carbon dioxide footprint, i.e. the emissions, by burning fossil fuels. The most promising acids for this process is carbon dioxide for at least initial precipitation of the lignin, and then using sulfuric acid ($H_2SO_4$) for washing and leaching out metals from the lignin. The sulfuric acid could be added as a fresh sulfuric acid from a chemical supplier, or as preferred using so called "spent acid" from a chlorine dioxide generator often used at a pulp mill. The latter usage of this spent acid already at hand in most mill sites further emphasize that the lignin product is considered as a "green" fuel.

One problem with the precipitation process is that lignin nucleus particles may form spontaneously throughout the acidified original black liquor in large numbers and at very small particle size, typically only 0.1-1 µm, and those small particles are very difficult to separate out in any subsequent dewatering process. Instead are larger lignin aggregates sought for which will improve filterability and increase lignin yield from the dewatering process.

SUMMARY OF THE INVENTION

The invention is based upon the finding that larger lignin aggregates may be formed in favor of smaller lignin particles if precipitation of lignin in the original black liquor instead takes place on lignin particles added to the original black liquor, i.e. that the lignin precipitates as particle growth instead of forming new lignin nucleus particles.

Thus, the invention is related to a method for separation of lignin from original black liquor having a first pH value, comprising the following phases in sequence:

a first precipitation stage wherein an acidifier charge is added to the original black liquor in order to decrease the pH value of the original black liquor to a second pH level initiating precipitation of lignin whereby said second pH level is above pH7 and below 11.5, followed by a separation phase wherein the precipitated lignin is separated as a lignin cake from the remaining liquid phase of the acidified original black liquor, and according to the inventive aspects are lignin germ particles added to the original black liquor in the first precipitation stage in order to increase lignin particle growth on such lignin germ particles instead of spontaneous nucleation of lignin particles in said original black liquor.

By adding these additional lignin germ particles could the lignin that precipitates from the original black liquor instead start to precipitate onto these lignin germ particles, already having a substantial size, avoiding spontaneous nucleation of a large number of small nucleus particles and instead precipitates as particle growth on these lignin germ particles, hence improving filterability and lignin yield from the process.

According to a preferred embodiment of the inventive method is the first precipitation stage divided into at least two phases in sequence, wherein a first acidifier charge is added to the original black liquor in a first precipitation phase in order to decrease the pH value of the original black liquor to a second pH level whereby less than 10% of the total lignin content is precipitated and preferably as small nucleus particles, said second pH level being at least 1 pH unit below that of the first pH value, a second acidifier charge is added to the acidified original black liquor from the first precipitation phase in a second precipitation phase in order to decrease the pH value to a third pH level whereby more than 20% of the total lignin content is additionally precipitated and preferably as growth of nucleus particles formed in the first precipitation phase and growth of nucleus particles precipitated in the second precipitation phase, said third pH level being at least 0.1 pH units below that of the second pH value, and wherein the lignin germ particles added is added after the first precipitation phase in order to be present during the second precipitation phase. By these method steps could the first precipitation phase be optimized for only lowering the pH using towers with small filling bodies increasing contact surface between acidifier and original black liquor, and avoid blockage of small flow channels trough such towers by introduction of lignin germ particles already during the first precipitation phase.

According to another embodiment of the invention is the lignin germ particles added at least in part as a fraction obtained from the lignin cake. Preferably is the fraction obtained from the lignin cake the smaller lignin particles in the lignin cake. Larger lignin particles in the lignin cake are already in shape for efficient dewatering while smaller lignin particles may be difficult to filter out and therefore may need a growth in size in order to increase filterability an hence increase lignin yield from the process.

According to an alternative or complementary embodiment of the invention is the lignin germ particles added in form of a lignin powder having a uniform particle size. Preferably the lignin powder has a particle size in the range of 0.1 to 1 millimeter. Thus, the lignin powder could be a commercial product with defined particle size that is either produced at the mill or bought from special suppliers.

According to yet another embodiment of the invention is the lignin germ particles suspended in a part flow from the remaining liquid phase of the acidified original black liquor, before being added into the precipitation stage. This will enable easy handling with pumps and reintroduction of these lignin germ particles into the precipitation process together with already acidified liquid not requiring more acidifier in order to lower the pH in the last phase of the precipitation stage.

It is intended throughout the present description that the expression "dewatering" embraces any means of dewatering. Preferably the dewatering is performed by using centrifugation, a filter press apparatus, a band filter, a rotary filter, such as a drum filter, or a sedimentation tank, or similar equipment, most preferred a filter press apparatus is used.

It is intended throughout the present description that the expression "original black liquor" embraces spent cooking liquor from a digester, having most of the lignin from the original cellulose material dissolved in the "original black liquor". The "original black liquor" may also have a large content of organic and inorganic material, but may also have passed through separation processes for extracting turpentine or other specific constituents, while keeping the bulk volume of dissolved lignin unaltered.

It is intended throughout the present description that the expression "lime kiln" embraces the conversion plant in the recovery island where the calcium carbonate in the lime mud obtained in the recaustizising plant is calcined to calcium oxide and reused in the lime cycle.

SHORT DESCRIPTION OF THE FIGURES

DETAILED DESCRIPTION OF THE INVENTION

Figure 1:
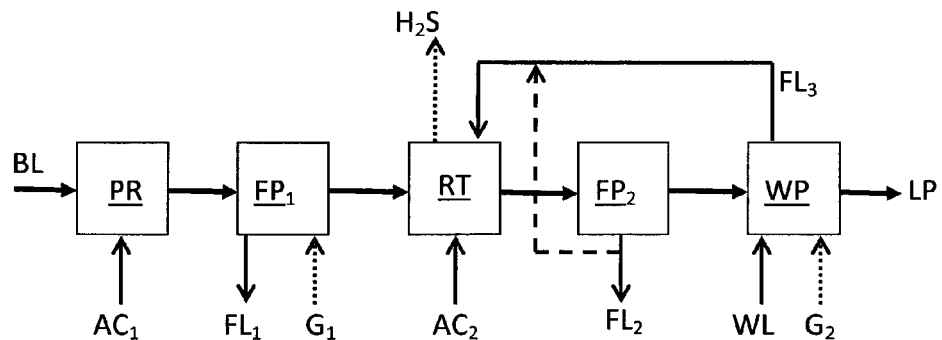
FIG. 1 shows the prior art lignin separation process according to WO 2006/031175.

In FIG. 1 is the known prior art process according to WO 2006/031175 shown. The separation of lignin from original black liquor BL comprising the following stages in sequence:

Precipitation of lignin by a first acidification stage of the original black liquor $BL_{IN}$ by adding a first acid or mixture of acids $AC_1$, in any suitable precipitation reactor PR, followed by dewatering while forming a first filter cake with high content of lignin, said dewatering made in any suitable filter press $FP_1$, which may drain a first filtrate $FL_1$ from the lignin suspension and have addition of gas blow trough $G_1$ of the lignin cake in order to displace any residual black liquor, suspending the first lignin filter cake obtained in stage b in a second acidification stage using a second acid or mixture of acids $AC_2$, said suspension made in any suitable suspension tank RT while discarding the odorous gases $H_2S$ emitted, whereupon a second lignin suspension is obtained in the suspension tank RTm, dewatering of the second lignin suspension forming a second filter-/lignin cake with high content of lignin, said dewatering made in any suitable filter press $FP_2$, which may drain a second filtrate $FL_2$ from the lignin suspension, and at least a portion of this second filtrate $FL_2$ may be re-circulated back to the suspension stage, washing the second filter cake, said washing made in any suitable wash apparatus WP, adding a wash liquid WL to this washing stage, and finally dewatering of the washed second lignin cake obtaining a lignin product LP, said dewatering preferably made in the last stages of the wash apparatus WP, which may drain a third filtrate $FL_3$ from the second filter/lignin cake, and at least a portion of this second filtrate $FL_2$ may be re-circulated back to stage c, and may also have addition of gas blow trough $G_2$ of the lignin cake in order to displace any residual acidic liquor.

Figure 2:
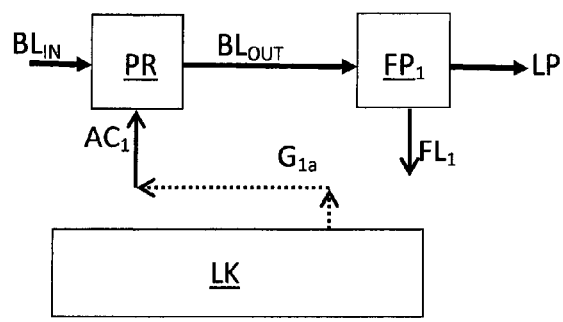
FIG. 2 shows usage of lime kiln gases in the precipitation stage.
Figure 3:
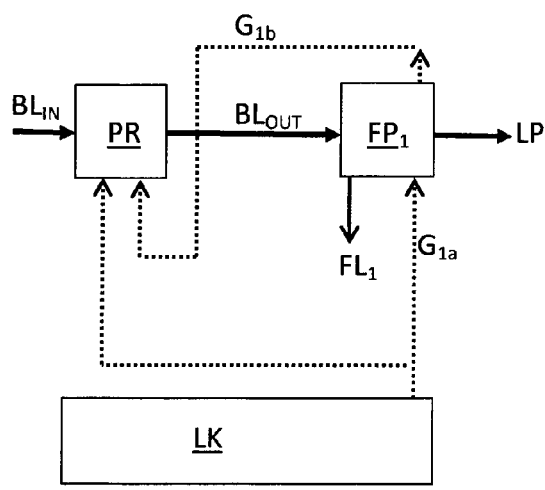
FIG. 3 shows usage of lime kiln gases in the precipitation stage as well as using at least a part of the lime kiln gases for dewatering the lignin cake/product.

In FIG. 2 is shown an alternative using flue gases $G_{1a}$ obtained from a lime kiln LK sent directly to the precipitation stage PR. Using lime kiln gases for acidification are known per se. At least a part of the first acid or mixture of acids added to the first precipitation stage could be gases rich in carbon dioxide and having its origin from flue gases vented from a lime kiln, meaning that the flue gases could be sent directly or indirectly to the precipitation stage. In FIG. 3 is shown yet an alternative where at least a part of the flue gases $G_{1a}$ vented from a lime kiln LK are first used for dewatering the lignin cake before being used as acidifier in the first precipitation stage, and the displaced residual gases $G_{1b}$ is also added to the precipitation stage PR together with lime kiln gases $G_{1a}$ sent directly to the precipitation stage.

Figure 4:
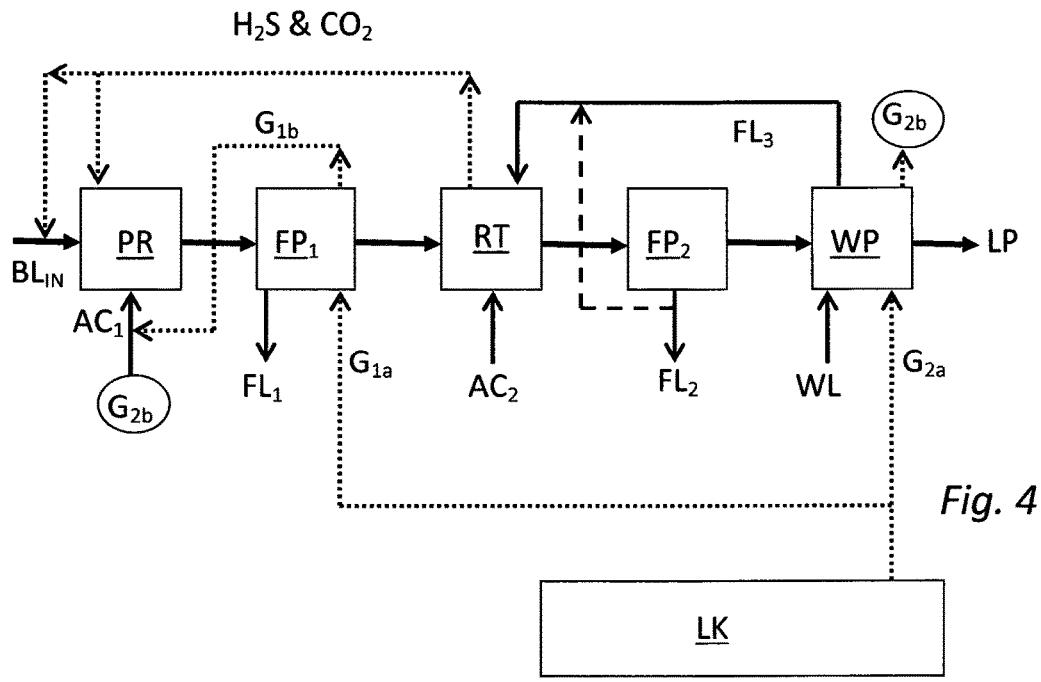
FIG. 4 shows usage of lime kiln gases in parallel in dewatering stages.

In FIG. 4 is shown a further preferred embodiment of the precipitation process according to WO 2006/031175. As disclosed earlier is the first precipitation stage PR and first dewatering stage $FP_1$ is followed by a suspension stage RT wherein the first lignin filter cake is suspended in a second acidification stage using a second acid or mixture of acids $AC_2$, whereupon a second lignin suspension is obtained. This stage is thereafter followed by a second dewatering stage $FP_2$ of the second lignin suspension forming a second filter cake with high content of lignin. A washing stage WP follows for washing the second filter cake and finally followed by a third dewatering stage of the washed second lignin cake obtaining a lignin product LP. According to the preferred embodiments of the inventive method are also the waste gases H₂S & CO₂ emitted from the second acidification stage RT re circulated and mixed with the original black liquor in the first precipitation stage PR. The carbon dioxide formed in the suspension tank, originates from the sulphides and carbonates content in the lignin cake. These compounds react with the acidifier and forms carbon dioxide ($CO_2$) and hydrogen sulfide ($H_2S$), according to:

$$CO_3^{2-} + 2H^+ <-> CO_2 + H_2O$$

$$HCO_3^- + H^+ <-> CO_2 + H_2O$$

$$S^{2-} + 2H^+ <-> H_2S$$

$$HS^- + H^+ <-> H_2S$$

The formation of carbon dioxide in this process enables a further source for carbon dioxide needed for the first acidification phase, and the hydrogen sulfide is also a net contributor to the acidification as the $pK_a$ value of hydrogen sulfide is 6.89.

In this embodiment are the lime kiln gases sent directly and in parallel flows $G_{1a}$ and $G_{2a}$ to the dewatering stages $FP_1$ and WP, and the displaced residual gases $G_{1b}$ and $G_{2b}$ from these dewatering stages are collected and added to the precipitation stage PR. Here are no flue gases from the lime kiln sent directly to the precipitation stage, but rather via said dewatering stages.

Figure 5:
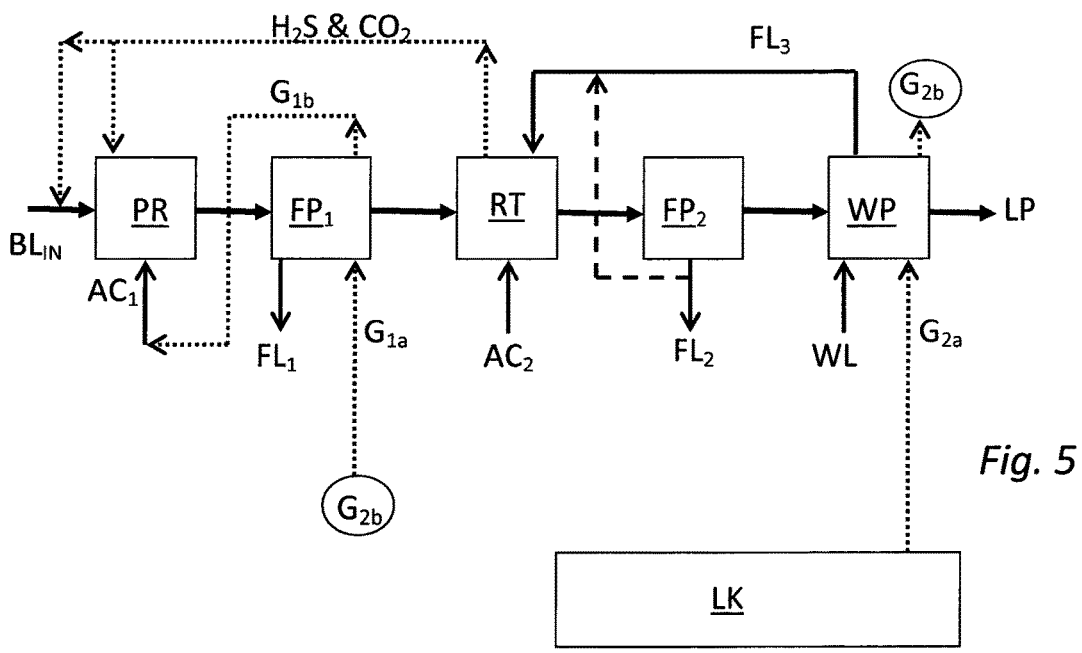
FIG. 5 shows usage of flue gases from lime kiln in series in several dewatering stages.

In FIG. 5 is shown an alternative embodiment of FIG. 4. In this embodiment is the lime kiln gases sent directly to the last dewatering stage WP, and the displaced residual gases $G_{2b}$ from this last dewatering stage are collected and added to a preceding dewatering stage, here $FP_1$. The displaced residual gases $G_{1b}$ from this preceding dewatering stage are collected and added to precipitation stage PR. Here are no flue gases from the lime kiln sent directly to the precipitation stage, but rather via usage in said dewatering stages and countercurrent to flow of lignin trough the process.

As could be understood from these examples of embodiments could direct feed and/or indirect feed to precipitation stage via dewatering stages of lime kiln flue gases be implemented in any possible ratio.

An additional procedure for stabilizing the lignin during the 2-stage process is, in combination with a pH-decrease, to adjust the ionic strength in the suspension stage, preferably with multivalent alkali metal ions or alkaline earth metal ions (e.g. calcium). At a given pH, a higher ionic strength in the suspension stage reduces the lignin yield losses. Here would also the ionic strength and pH of the wash water essentially corresponds to the conditions in the suspension stage to avoid gradients during the washing process. A higher ionic strength in the suspension and in the wash water gives a stable lignin and high lignin yield even at pH-values in the upper acidic range.

One disadvantage with the described solutions is that the acidic filtrate from dewatering stages contains a lot of sulphur, and if these acidic filtrates are sent to the recovery island then the sulphur will end up in the recovery boiler ashes and the sulphur balance will be affected needing a compensatory charge of fresh sodium in order to reestablish the correct sulphur balance.

Figure 6:
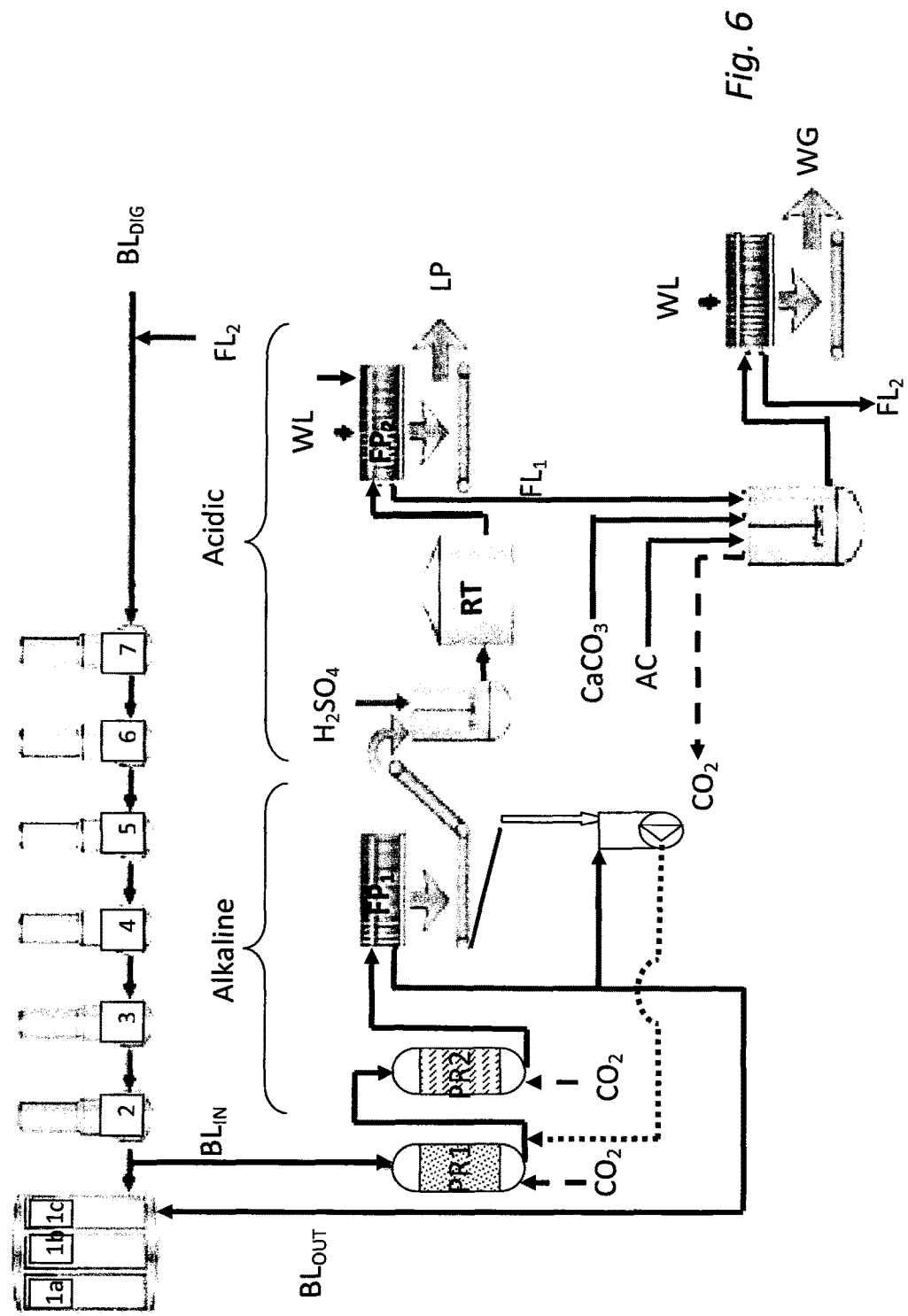
FIG. 6 shows a process chart of one example of implementation of the inventive addition of lignin germ particles during the precipitation process.

In FIG. 6 is the Lignoboost process disclosed with a sulphur removal process. In most parts is here shown the basic stages as disclosed in previous figures, but here disclosed how the Lignoboost process is connected to the recovery operations, i.e. evaporation stages 2 to 7 receiving black liquor, $BL_{DIG}$, from a digester. The original black liquor $BL_{IN}$ to be handled in the Lignoboost system is extracted after evaporation stage 2 and typically holds a dry matter concentration of about 42% and a pH of about 13. Preferably is only a part of the total flow diverted to the Lignoboost process. According to latest findings is the precipitation process divided into at least 2 phases in two towers in series, using a first precipitation tower PR1 wherein the main objective is to lower the pH level towards a starting point for precipitation of lignin nucleus particles. Preferably has this tower a random filling with filling bodies, such as Rachig rings, increasing the contact surface area between acidifier and black liquor. Typically the pH is lowered down to about 11.5 in the first tower. In the second tower PR2 is the final lowering of pH implemented and the major part of lignin precipitates here and thus this tower is of an open design allowing such lignin precipitate to flush trough. The pH at end of this second tower is about 11, and thus still alkaline. The black liquor with its content of lignin precipitate is forwarded to a subsequent dewatering apparatus, $FP_1$, which filters out the lignin precipitate as a cake, the downward arrow in figure, and the remaining liquid phase $BL_{OUT}$ of the acidified original black liquor is sent back to final evaporation stages 1a-1b-1c. The lignin cake is transported by conveyer belts to a mixing vessel where the lignin cake is suspended in a strong acid solution establishing a pH level below 5 and maintaining the acidified lignin suspension in this suspension state for at least 2 minutes in a retention tank RT. Finally the acidified lignin suspension is sent to a dewatering apparatus FP2, wherein a second lignin cake, LP is filtered out from the acidic liquid phase ($FL_1$). The acidic liquid phase FL1 is subjected to a sulphur removal process wherein a calcium containing compound, here $CaCO_3$, is added to the acidic liquid phase in a mixing vessel, whereby sulphur in the acidic liquid phase is reacting with the calcium compound forming solid gypsum, $CaSO_4$. The solid gypsum is thereafter separated from the acidic liquid phase in a dewatering apparatus, which may include washing water addition. The dewatered and preferably washed solid gypsum WG is bled out and the remaining acidic liquid phase $FL_2$ with reduced sulphur content is sent to chemical recovery, and preferably as shown mixed into the flow of black liquor BLDIG from the digester. The gypsum bled out could be sold as base material for gypsum board production or other uses, or may even be sent to landfill. When adding $CaCO_3$ to the acidic liquid phase $FL_2$ will the pH increase to about 12 even if the acidic liquid phase has a starting pH level of about 2. At such high pH level as 12 will the solubility of gypsum, $CaSO_4$ be increased and in order to promote forming a solid phase of gypsum should acid be added, preferably an organic acid such as acetic acid or formic acid, and in an amount such that the pH level is kept at about 5. Another advantageous effect is that carbon dioxide is formed in the sulphur removal process, and in such an amount that it corresponds to roughly 25-30% of the need for CO2 in the precipitation stage. According to the invention are lignin germ particles added to the precipitation stage, and in this embodiment shown in FIG. 6 are these lignin germ particles obtained from a sifting conveyer belt that will pass smaller particles from the lignin cake down to an inclined diverter that forward these lignin germ particles LGP to a mixing tank. In this mixing tank could the lignin germ particles be suspended in a part flow from the remaining liquid phase of the acidified original black liquor $BL_{OUT}$, before being added into the precipitation stage.

Figure 7:
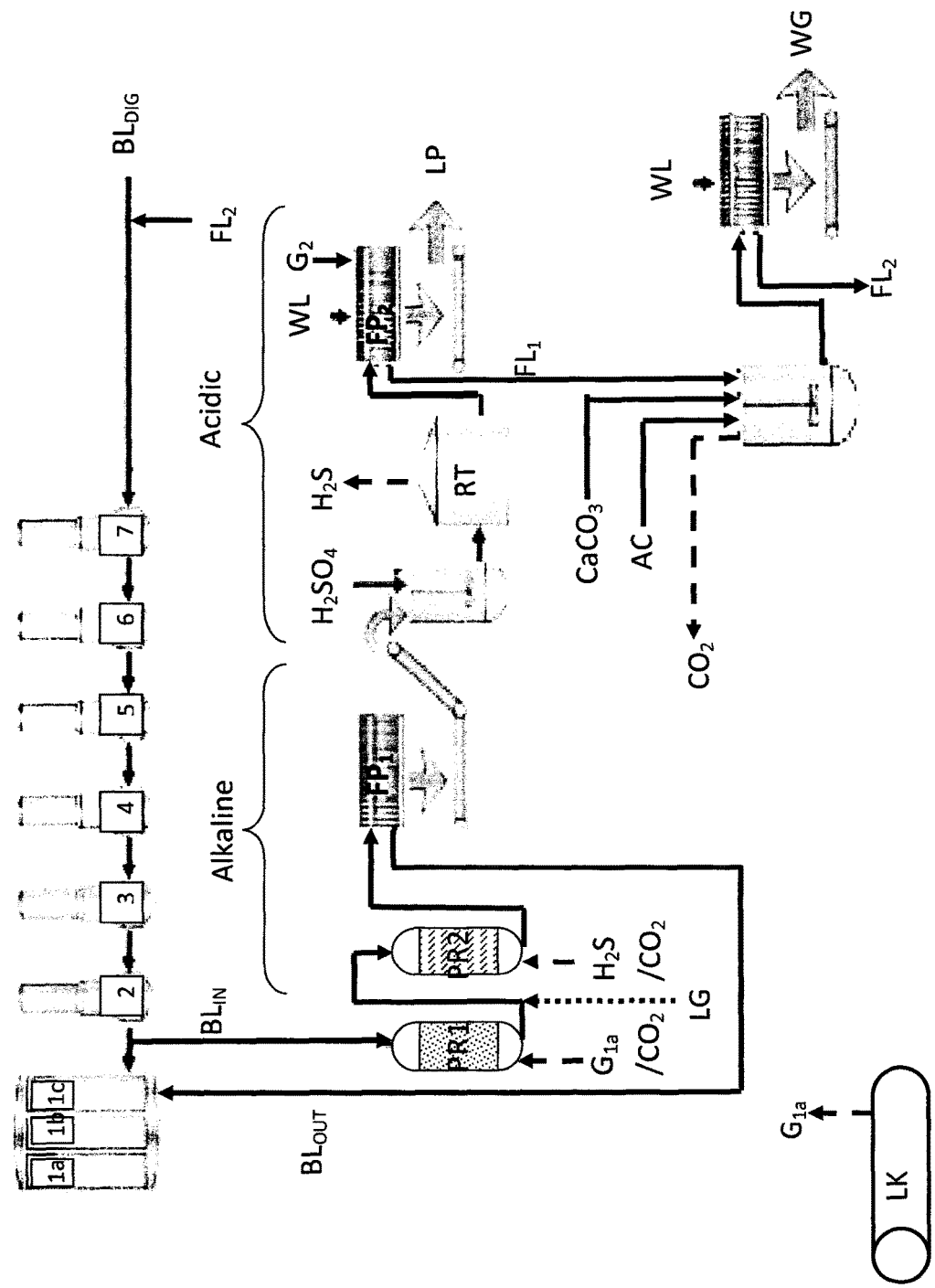
FIG. 7 shows an alternative implementation of the inventive addition of lignin germ particles during the precipitation process with alternative recycling of acidifiers produced in the process.

In FIG. 7 is shown an alternative set up of the system shown in FIG. 6, but indicating alternative sources for acidifier for the precipitation stage similar to the ones shown in FIGS. 1-5. Here is indicated that lime kiln gases $G_1a$ may be sent to first precipitation tower PR1, and that vent off gases from the suspension stage in retention tank RT may be sent to second precipitation tower PR2. According to the invention is lignin germ particles LG added to the precipitation stage, and in this embodiment shown in FIG. 6 are these lignin germ particles obtained from lignin powder having a uniform particle size and these could be added directly into the transfer piping from first vessel PR1 to second vessel PR2. Preferably could some mixing effect be introduced, and may be added into the suction side of any pump forward this mixture to second vessel PR2. Preferably is this lignin powder having a uniform particle size and with a particle size in the range of 0.1 to 1 millimeter, thus significantly larger than lignin nucleus particles spontaneously precipitated in the process.

It is to be noted that only a part of the lignin content is sought for precipitation, as the residual black liquor $BL_{OUT}$ is sent to the conventional recovery process, and thus a certain amount of lignin is needed in order to maintain some of the combustible content, i.e. heat value, for the recovery boiler. Thus, it is of importance that the residual black liquor after the precipitation process still is alkaline and do not add problems in the subsequent recovery process. The Lignoboost process is thus ideal for overloaded mills where the recovery operations in the evaporation plant or in the recovery boiler has reached its operational limit, and further capacity for handling increased black liquor volumes is needed. Instead could the capacity of the pulping process be increased, and the increased black liquor volumes are met with a complementary process producing a "green" fuel of great value.

While the present invention has been described in accordance with preferred compositions and embodiments, it is to be understood that certain substitutions and alterations may be made thereto without departing from the spirit and scope of the following claims.

We claim:

1. A method for separation of lignin from original black liquor having a first pH value, comprising the following phases in sequence:
   adding a first acidifier charge to the original black liquor in a first precipitation phase to decrease the first pH value of the original black liquor to a second pH level whereby less than 10% of the total lignin content is precipitated, the second pH level being at least 1 pH unit below that of the first pH value;
   adding lignin germ particles to the acidified black liquor after the first precipitation phase to be present during a second precipitation phase;
   adding a second acidifier charge to the acidified original black liquor, containing lignin germ particles, from the first precipitation phase in the second precipitation phase to decrease the pH value to a third pH level whereby more than 20% of the total lignin content is additionally precipitated as growth on lignin germ particles added after the first precipitation phase and growth of nucleus particles precipitated in the second precipitation phase, the third pH level being at least 0.1 pH units below that of the second pH value;
   wherein the second pH level is above pH 7 and below 11.5;
   followed by a separation phase, separating the precipitated lignin as a lignin cake from a remaining liquid phase of the acidified original black liquor; and
   the added lignin germ particles increasing lignin particle growth on the lignin germ particles instead of spontaneous nucleation of lignin particles in the acidified black liquor.

2. The method according to claim 1 wherein the lignin germ particles added are at least in part a fraction obtained from the lignin cake.

3. The method according to claim 2 wherein the fraction obtained from the lignin cake is the smaller lignin particles in the lignin cake.

4. The method according to claim 1 wherein the lignin germ particles added are lignin powder having a uniform particle size.

5. The method according to claim 4 wherein the lignin powder has a particle size in the range of 0.1 to 1 millimeter.

* * * * *